United States Patent [19]

Suzuki et al.

[11] Patent Number: 4,659,971
[45] Date of Patent: Apr. 21, 1987

[54] ROBOT CONTROLLING SYSTEM

[75] Inventors: Hayao Suzuki; Yoshiharu Matsuoka, both of Tokyo, Japan

[73] Assignee: Seiko Instruments & Electronics Ltd., Tokyo, Japan

[21] Appl. No.: 766,907

[22] Filed: Aug. 16, 1985

[30] Foreign Application Priority Data

Aug. 16, 1984 [JP] Japan .................................. 59-170952

[51] Int. Cl.⁴ ................................................ G05B 19/42
[52] U.S. Cl. ........................................ 318/568; 901/16
[58] Field of Search ............ 318/568, 568 AB, 568 B; 901/27–29, 16; 364/513

[56] References Cited

U.S. PATENT DOCUMENTS

| | | | |
|---|---|---|---|
| 4,445,184 | 4/1984 | Noguchi | 318/568 B |
| 4,511,985 | 4/1985 | Inaba et al. | 318/568 B |
| 4,517,653 | 5/1985 | Tsuchihashi | 318/568 AB |
| 4,561,050 | 12/1985 | Iguchi et al. | 318/568 X |

Primary Examiner—Benjamin Dobeck
Attorney, Agent, or Firm—Robert E. Burns; Emmanuel J. Lobato; Bruce L. Adams

[57] ABSTRACT

A robot control system comprises a hand movable along a plane according to position command data determined based on an absolute coordinate system arranged along the plane, and rotatable around an axis vertical to the plane according to angular command data determined with respect to a base axis of the absolute coordinate system for working a workpiece at a certain working point thereof with a certain angular position of the hand. Input means inputs working point data representative of the working point in terms of a local coordinate system arranged on the workpiece, angular position data representative of the angular position of the hand at the working point determined with respect to a base axis of the local coordinate system, and position data of the workpiece located along the plane in terms of the absolute coordinate. Calculation means calculates the linear and angular displacements of the local coordinate system relative to the absolute coordinate system according to the position data of the workpiece provided by the input means. First transformation means transforms the local working point data provided by the input means to the absolute position command data according to the calculated linear and angular displacements. Second transformation means transforms the local angular position data provided by the input means to the absolute angular command data according to the calculated angular displacement.

22 Claims, 2 Drawing Figures

ROBOT CONTROLLING SYSTEM

BACKGROUND OF THE INVENTION

Various types of general purpose robots which are driven by a servomotor, a servovalve and others and provided with a plurality of drive axes operated and controlled by a controller have been developed to exercise a great performance for saving labor, rationalization of working and other purposes. The robots include those of the cylindrical coordinate type robot, orthogonal coordinate type robot and horizontally articulated type robot which have a vertical drive axis and are capable of positioning the axis at an arbitrary point along a horizontal plane rectangular to the axis. Most of these robots are provided with an axis capable of turning a workpiece posture for arbitrarily handling the workpiece within a horizontal plane at the nose of an arm. There is also such a general purpose robot which has three moving axes for space locating and three moving axes for hand posture controlling. What is common to these robots is that there are provided means for locating a robot hand on an arbitrary point along a plane and another means for turning the hand in an arbitrary direction around an axis vertical to the plane.

If robots are provided with means for locating a workpiece at a point within a plane and another means for turning a workpiece posture freely on the plane, then the workpiece can be incorporated to various kind of members to be assembled, and thus a flexibility in assembling function of the robots are improved so high. This invention therefore relates to the robot controlling system as described hereinabove.

However, the system for controlling such robots with high flexibility as mentioned comprises merely a system of teaching playback in most cases, and the teaching work yet has many problems.

In an assembling robot system for which a high locating precision is required, it is very difficult to match an arm origin position to the installation standard position of a robot with the high locating precision mechanically, moreover it is also difficult to match a position of a table for installing the robot thereon, a supply equipment such as pallet or the like, and members disposed peripherally of the robot such as a substrate member to be assembled and the like with a locating precision required relative to the robot arm.

Under the existing circumstances of manufacturing robots and robot systems as described above, the system controlled only based on teaching playback requires repeated teaching operation with respect to the same operating position in the member with reference to operating positions and hand directions in the member even if the same system is manufactured more than one, and with respect to the same members placed at different places in the same system.

For the reason given above, a method has been already proposed in our Japanese Application No. 59-128953. The method comprises the steps of defining a local coordinate system in a member to be assembled so as to designate many operating positions in an assembled setup, setting the operating position in terms of a coordinate of the local coordinate system, specifying only the coordinate taken by a reference point of the local coordinate system in a robot absolute coordinate system according to teaching method or other steps, operating a robot at each operating position of the member to be assembled according to a coordinate transformation between the local and absolute coordinate systems. This invention is to provide a controlling system in which the above method is further improved.

An object of this invention is to simplify substantially the operation for specifying an operating position and a hand direction when operation is carried out at a plurality of operating positions of the same member to be assembled placed in a plurality of places in the same robot system.

Another object of this invention is to simplify indication of an operating position and a hand direction second robot system and so on when the same robot system is used as the second robot system.

A further object of this invention is to facilitate an off-line teaching operation according to CAD, CAM and the like.

A superiority of the operating point setting system according to the local coordinate system described above in the aforesaid Japanese Application No. 59-128953 is as follows:

Members to be assembled include a member like a printed circuit substrate, for example, which has many operating points exceedingly precise in positional relation with each other. For such parts, a technique according to an on-line teaching of each operating position must be rather avoided, and the operating position can be set precisely by far according to a numeric input or off-line teaching in terms of a coordinate of the local coordinate system arranged on the member with a reference point. Further, it is advantageous to set only a coordinate of a reference point of the local coordinate system in a robot absolute coordinate system, thereby carrying out an actual operation through coordinate transformation between the local and absolute coordinate systems.

The above method relates only to a coordinate of the operating position, however, a method effective to correct an angular direction of a part incorporated into the member has not been in practice until now. Including the angular direction of parts, this invention simplifies the operating point setting method in a local coordinate.

In order to facilitate CAD, CAM in application of the robot, the operating position and the hand direction can be given by numeric input or off-line teaching as a coordinate in the local coordinate system and as an angle relative to a standard or base axis of the local coordinate system as described above.

DETAILED DESCRIPTION OF THE INVENTION

Figure 1:
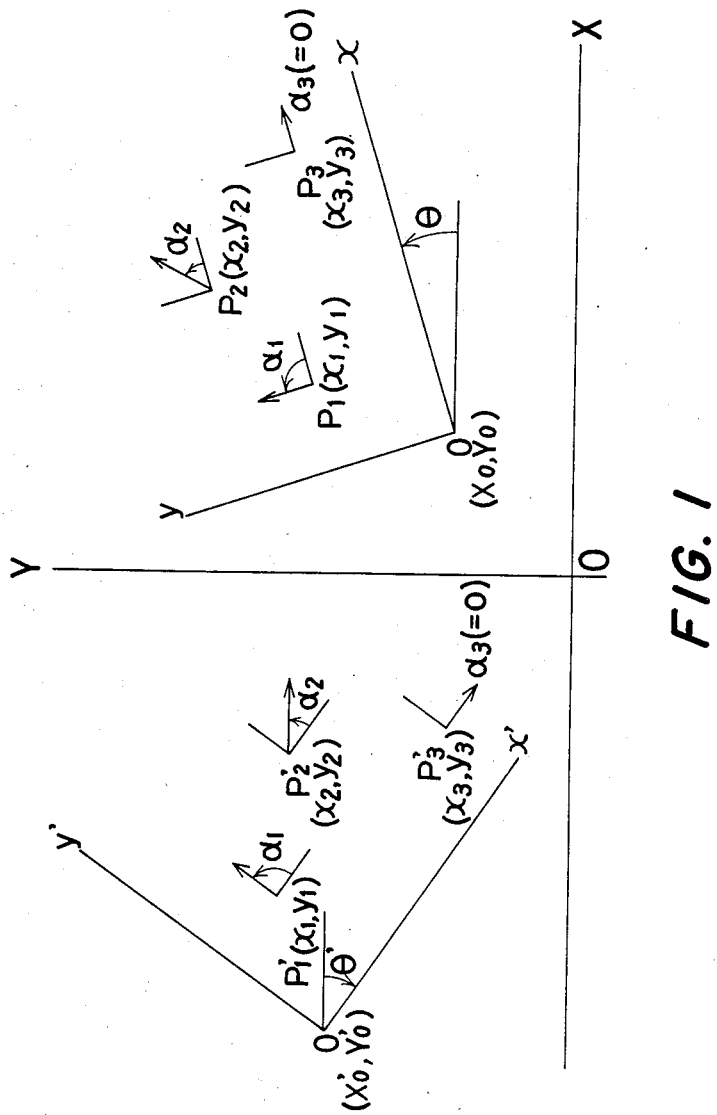
FIG. 1 is illustrative of an embodiment of this invention, wherein two substrates comprised of a same member to be assembled which has many operating points are placed along a plane defined by a robot absolute orthogonal coordinate system.

FIG. 1 represents the local coordinate systems xy and x'y' arranged on the same two substrates or workpieces respectively which are members to be positioned along a plane defined by a robot absolute coordinate system XY.

Working points P1, P2, P3 and P1', P2', P3' are exactly the respective same points on the substrates. The working points P1, P2, P3 and P1', P2', P3' are determined by coordinates $(x_1, y_1)$ $(x_2, y_2)$ $(x_3, y_3)$ of the local coordinate systems xy, x'y' respectively. The coordinates are local hand position coordinates or working point data representative of the working points in the same member and hence very high in precision generally. Then, the coordinate values can easily be provided to the robot system according to a numeric input or an off-line teaching.

Further, the local hand position coordinates can also be set according to an on-line teaching. In this case, the local coordinate system xy or x'y' is taught first in the robot absolute coordinate system, and then P1, P2, P3 are taught as points on the local coordinate system.

For example, a plane parallel with the plane defined by the robot absolute coordinate system defines the local coordinate system xy in the form of an orthogonal coordinate system, and an origin of the local coordinate system xy and one reference point existing on x-axis or y-axis can be specified as a plurality of reference points or position data of the workpiece representative of the workpiece position in terms of the robot absolute coordinate system. After so specified by teaching, the local hand position coordinates or working point data representative of the working points P1, P2, P3 are taught, then absolute coordinates of P1, P2, P3 or position command data obtained through expression (1) by means of an arithmetic function of a robot controller. In the expression (1), coordinates of P1, P2, P3 in terms of the local coordinate system are represented by (x, y) and a corresponding coordinate in terms of the robot absolute coordinate system is represented by (X, Y), an origin of the local coordinate system in terms of the robot absolute coordinate system is $(X_0, Y_0)$ which then determines linear displacement of the local coordinate system relative to the robot absolute coordinate system, and an angular displacement of the local coordinate system xy with respect to the robot absolute coordinate system is $\theta$.

$$\begin{vmatrix} x \\ y \end{vmatrix} = \begin{vmatrix} \cos\theta & \sin\theta \\ -\sin\theta & \cos\theta \end{vmatrix} \begin{vmatrix} X - X_0 \\ Y - Y_0 \end{vmatrix} \quad (1)$$

Then, where a coordinate of the reference point existing on the x-axis measured in terms of the robot absolute coordinate system is $(X_1, Y_1)$, $\cos \theta$ and $\sin \theta$ are obtained through:

$$\cos\theta = \frac{X_1 - X_0}{\sqrt{(X_1 - X_0)^2 + (Y_1 - Y_0)^2}}$$

$$\sin\theta = \frac{Y_1 - Y_0}{\sqrt{(X_1 - X_0)^2 - (Y_1 - Y_0)^2}}$$

Along with the above coordinate transformation, the robot control system transforms a local hand direction angle data or local angular position data of the hand to absolute hand direction angle data or angular command data necessary for assembling the workpiece concurrently. Arrows indicated at the coordinate points P1, P2, P3, P1', P2', P3' in the drawing indicate the local hand direction angles determining the angular position of the hand around an axis vertical to the plane. The hand direction angle is expressed by an angle relative to the coordinate standard or base axis of the local coordinate system and can easily be set according to numeric input and off-line teaching.

Then, the local hand direction angle data can also be set according to on-line teaching, and a correction or transformation of the local hand direction angle data is undergone to obtain the absolute hand direction angle data or the angular command data determined relative to a coordinate standard or base axis of the robot orthogonal absolute coordinate system through teaching by subtracting the angular displacement of the local orthogonal coordinate system relative to the robot orthogonal absolute coordinate system from the local hand direction angle data.

As described above, the local operating position coordinate specified in the local coordinate system is transformed through an inversion of the expression (1) to the absolute coordinate of the robot absolute coordinate system at the time of practical operation, and the absolute hand direction angle at the corresponding operating position is obtained from adding $\theta$ reversely to the local hand direction angle obtained through on-line teaching.

As described, the hand position coordinate transformation and specified hand direction angle transformation can be effected easily between the robot absolute coordinate system and the local coordinate system by this robot controlling system.

At the time of on-line teaching, the hand direction angle is unchanged, in most cases, with respect to different operating points, and since setting the hand direction angle data at every operating points involves a troublesome work considerably, it is desirable that a jogging operation for teaching is carried out with the hand direction angle being kept constant. In this connection, an orthogonal coordinate type robot is ready for such operation unconditionally, however, the axis for turning work posture must be turned reversely therefor by the angle at which the arm is turned in the case of cylindrical coordinate type and horizontal articulated type robots.

The operation described above is, as a matter of course, for a robot having three moving axes for space locating and three moving axes for hand posture controlling. By doing such, an teaching operation for which the hand direction must be set can be simplified.

Figure 2:
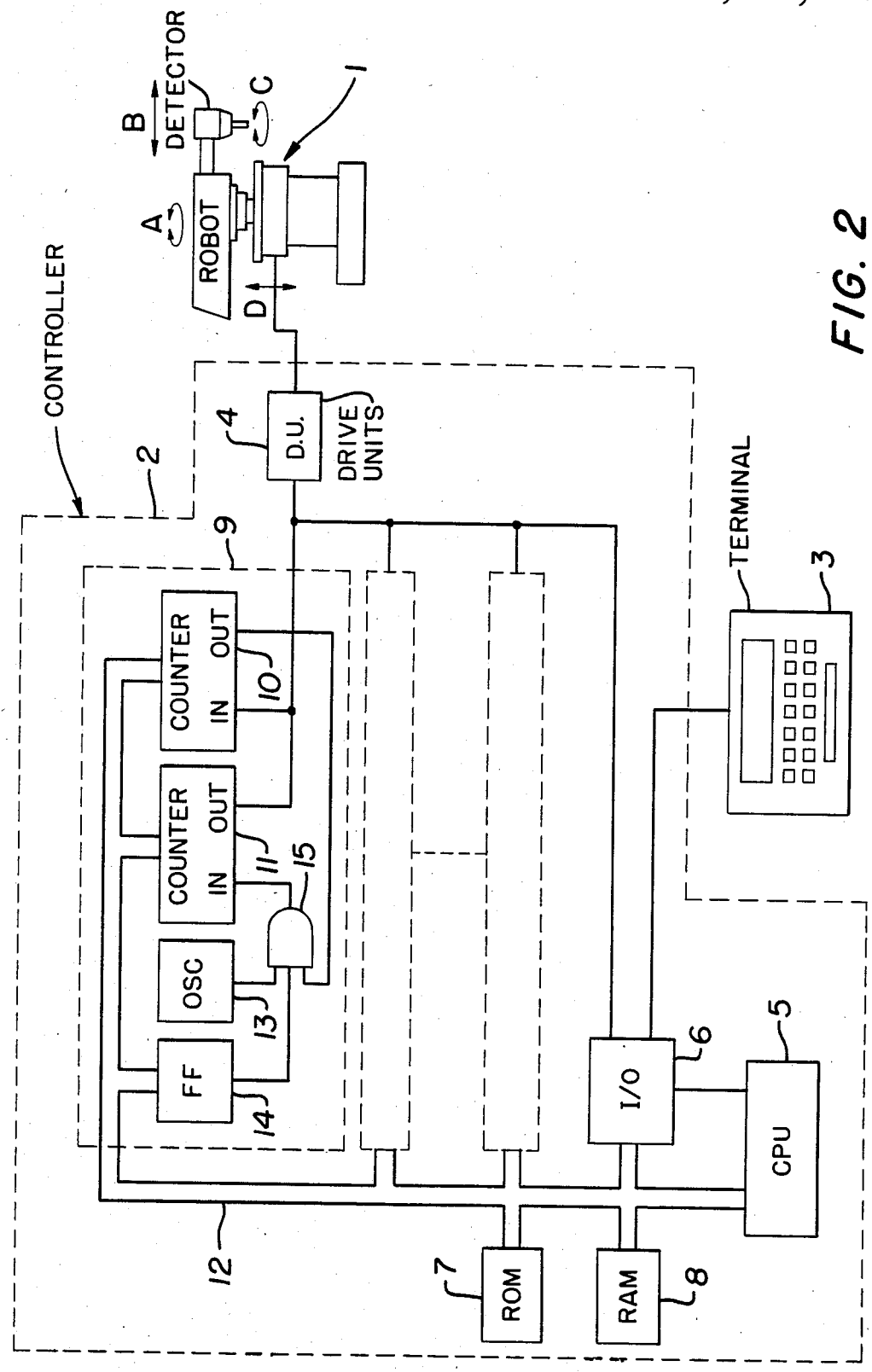
FIG. 2 is a block diagram of the embodiments of the control system for operating a control system of the embodiments of this invention, wherein xy, x'y' designate substrate local coordinate systems, $P_1, P_2, P_3$, $P_1'$, $P_2'$, $P_3'$ designate operating positions, and $\alpha_1$ to $\alpha_3$ designate angles indicating a hand direction relative to x-axis or X'-axis in each operating position.

The same operating positions P1 and P1', P2 and P2' and P3 and P3' on the local coordinate systems xy, x'y' as illustrated in FIG. 2 are specified exactly as the same local coordinate value as well as the hand posture or hand direction angle relative to the coordinate systems xy, x'y'. Therefore, it is particularly advantageous when a member to be assembled at different operating positions is placed in the robot system, and in case P1, P2, P3 are specified through teaching or other means, the robot can be operated accordingly by specifying exactly the same local hand position coordinates and local hand direction angles for P1', P2', P3' and simply by specifying the position of local coordinate system x'y' along the absolute coordinate system XY.

Further, as described in Prior Art, it is very difficult to place a robot precisely in the installation standard position and also to prepare a position for mounting a member disposed in the periphery of the robot precisely. However, the precision is important mechanically when the same robot system is used more than one. In such a case, the operating point in a member to be assembled and the hand posture are specified identically by means of the local coordinate system, the mechanical precision is achieved by an teaching of the local coordinate system, and the hand position coordinate transformation and the hand posture or hand direction angle correction are carried out as described in the paragraph (Action), thereby operating the robot.

In any embodiments, teaching points can be sharply decreased.

Further, at the time of coordinate transformation between the local coordinate system and the robot absolute coordinate system, a burden for programming will not be increased even adding an angle correcting function for correcting an angle of the hand posture concurrently. Then, when the operating position is specified (including the teaching operation) as a coordinate of the local coordinate system, a hand direction angle relative to the coordinate standard axis of the local coordinate system is stored automatically together with the corresponding coordinate of the operating position, and thus a programming is undergone without consciousness particularly of the hand angle.

An embodiment of the control system for controlling the embodiment of the present invention as above-mentioned, is shown in a block diagram of FIG. 2.

In FIG. 2, a robot of the cylindrical coordinate type is designated by reference number 1, wherein a hand thereof is driven to arbitrary points along the horizontal plane through the rotation movement A of the arm and the horizontal linear movement B of the angular arm and the direction of the hand with respect to a rotational axis thereof vertical to the horizontal plane is controlled to change to an arbitrary angular direction through the rotation movement C of the hand.

In addition, the linear movement D is executed so as to move the hand to the vertical direction. These movements are undergone by the operating shafts connected to a driving source such as a motor and the like.

This control system comprises a controller 2 which controls the driving source and a terminal 3 which is provided with a key board and a display device to program the operating sequence of the robot and keys which conduct jogging operation of the operating axes of the robot 1 so that the terminal 3 can teach the operating position of the robot.

The controller 2 comprises a plurality of drive units 4 which control the driving source such as motors and the like (not shown) so as to drive a plurality of operating axes of the robot; an input and output control portion (I/O) 6 which is operable to execute receiving of input signals from the terminal 3 and sending of output signals displayed in the terminal, of output signals of the operating axes of the robot 1 and receiving of the over-load signal of the motors and the like from the drive units, sending of operating signals of the hand, receiving of the robot condition signals and sending and/or receiving control signals between the peripheral device of the robot and the I/06 and which is composed of the LSI and the like; a CPU 5 which is operable to execute processing the signals from the input-output control portion 6, controlling reading-out and/or storing of the data of a RAM 8 and reading-out of the data of a ROM 7, and operating the coordinate operation and/or logical operation of the robot; a RAM 8 which memorizes such data as the program data processed by the CPU 5, or robot operating position data, in accordance with the program signal from the terminal 3; a ROM 7 which memorizes the procedure for executing each of the commands of the program data stored in the RAM 8; and a plurality of movement control circuits 9 for outputting a movement command pulse to the drive units 4.

In the movement control circuit 9, the movement pulse number is set in the counter 10 and the interval between movement pulses that is in inverse-proportion to the movement speed, is set in the counter 11. Both of them are input from CPU 5 through the bus 12. In the counter 10, down counting is executed when the movement pulse is applied to the input terminal IN, and when the content becomes zero, the output terminal OUT becomes low level. The output pulse number of the counter 11 is the quotient which is obtained by dividing the input pulse number with the number proportional to the set interval. Oscillator 13 is an oscillator producing a certain frequency and flip-flop 14 is controlled in accordance with commands from the CPU 5.

In case that the pulse number and the pulse interval are set as mentioned above, when the flip-flop 14 is set by the CPU 5, the pulses with the certain frequency generates at the AND gate 15, and is applied to the counter 11, and the outputs of the counter 11 that are pulses with the same interval as the set one, are applied to the input terminal of one of drive units 4 and the input terminal of the counter 10.

When the counter 10 counts down the set pulse number, the output thereof becomes low-level to close the AND gate 15, and the pulses applied to the movement drive unit 4 stops.

Accordingly, the movement control circuit 9 can output the pulses to the drive unit 4, with the pulse number and frequency commanded by the CPU 5.

In the control system of the FIG. 2 as above-mentioned, the CPU 5 reads normally the present positions of a plurality of operating axes and especially the present positions in terms of the absolute coordinate of the robot as a matter of course, whereby the local coordinate system is determined by the two reference points thereof measured in terms of the absolute coordinate system and is stored within the RAM 8. This is a programmable function which is obtained by utilizing fundamental functions of the CPU. The CPU 5 is able to numerically determine the operating positions of the coordinates in terms of the local coordinate system which are designated by the program and hand-angles or hand direction angles relative to the standard axis of the local coordinate system, by numerical inputting operation from the terminal 3.

Besides, in the case that the coordinates of the operating positions in terms of the absolute coordinate system and the hand-angles relative to the standard axis of the absolute coordinate system at each of the operating positions are specified by the teaching operation, by operating the numerical operation function of the CPU 5 the hand position coordinates in terms of the absolute coordinate system is converted to the hand position coordinates in terms of the local coordinate system specified by the program.

While, conversely, the CPU 5 is able to reversely convert the coordinates of the operating positions in terms of the local coordinate system specified by the program and the corresponding hand-angles relative to the standard axis of the local coordinate system each of the operating positions to the coordinates of the operating positions in terms of the absolute coordinate system and the hand-angle thereof relative to the standard axis of the absolute coordinate system at each of the movement positions, as a matter of course, by the numerical operation function of the CPU 5.

In a robot of cylindrical coordinate type, the function to move the hand in the mode that the hand posture is maintained to a predetermined direction, is executed by determining the angle of the rotation movement A of the arm at each of the movement positions and by executing the reverse rotation movement C of the hand to compensate the angle of the rotation movement A. This is executed by utilizing the numerical operation function of the CPU 5. It is determined by the program whether this mode is selected or not. When the absolute coordinate system and the local coordinate system of the robot are respectively an orthogonal system, it is easy for the programmers to carry out the inputting operations of the hand-position and corresponding hand-angles relative to the standard axis from the terminal 3.

It is executed by generally wellknown expression (2) to convert a coordinate (X, Y) of the orthogonal absolute coordinate system of the robot, into a coordinate (r,α) of the articular polar coordinate system of the cylindrical coordinate typed robot.

$$r = \sqrt{X^2 + Y^2}$$

$$\alpha = \tan^{-1} Y/X \quad (2)$$

Thus, after operating CPU 5, the operation axis of the robot 1 becomes operable in accordance with the command of the CPU 5.

As described above with reference to the embodiments, a system effective to simplify a teaching operation can be provided according to the invention, when a robot is operated to work a member to be assembled which has many operating positions, or the same robot system is used more than one. The feature that the hand posture can also be corrected enhances an effect of the invention, and its technical and economical effects are outstanding.

What we claim is:

1. In a robot controlling system at least having means for locating a hand at an arbitrary point along a plane, means for turning said hand in an arbitrary direction about an axis vertical to said plane, and means for actuating said hand according to a hand position coordinate and a hand direction angle stored in a RAM based on a robot absolute coordinate system and a programmed sequence, the improvement comprising:
   means defining one local coordinate system according to a plurality of reference points in the robot absolute coordinate system;
   means for storing a hand position coordinate of said local coordinate system and a hand direction angle relative to a coordinate standard axis of said local coordinate system at each operating position of the hand;
   means for transforming said hand position coordinate of said local coordinate system to said hand position coordinate of the robot absolute coordinate system; and
   means for correcting the hand direction angle relative to the coordinate standard axis of said local coordinate system by an angular displacement of the coordinate standard axis of said local coordinate system relative to a coordinate standard axis of the robot absolute coordinate system.

2. The robot controlling system according to claim 1, further comprising;
   means defining another local coordinate system;
   means for storing said hand position coordinates of said one local coordinate system and said hand direction angle relative to the coordinate standard axis of said one local coordinate system as the identical hand position coordinates of another local coordinate system and as the identical hand direction angle relative to the coordinate standard axis of another local coordinate system;
   means for transforming said defined hand position coordinates of said another local coordinate system to hand position coordinates of the robot absolute coordinate system; and
   means for correcting said defined hand direction angle relative to the coordinate standard axis of said another local coordinate system by an angular displacement of the coordinate standard axis of said local coordinate system relative to the coordinate standard axis of the robot absolute coordinate system.

3. The robot controlling system according to claim 1 or 2, further comprising;
   jogging means for teaching an operating position of the hand to provide the local hand position coordinate; and
   means for setting a jogging mode for controlling the hand not to change the angular direction thereof despite changing the position thereof during the jogging operation.

4. The robot controlling system according to claim 1 or 2; wherein said local coordinate systems comprise an orthogonal coordinate system.

5. The robot controlling system according to claim 1 or 2; wherein said robot absolute coordinate system comprises an orthogonal coordinate system.

6. The robot controlling system according to claim 1 or 2; wherein said means defining one local coordinate system defines the one local coordinate system according to an origin of said local coordinate system and another point existing on the coordinate standard axis of said local coordinate system extending along the plane.

7. The robot controlling system according to claim 1 or 2; wherein said means for storing a hand direction angle relative to a coordinate standard axis of a local coordinate system stores the hand direction angle automatically at the same time when a hand position coordinates of the local coordinate system is stored.

8. The robot controlling system according to claim 1 or 2; wherein said means for correcting a hand direction angle relative to a coordinate standard axis of a local coordinate system corrects the hand direction angle automatically at the same time when a hand position coordinates of the local coordinate system is transformed to a hand position coordinates of the robot absolute coordinate system.

9. A robot controlling system comprising: a hand movable along a plane according to position command data determined based on an absolute coordinate system related to the plane, and rotatable around an axis vertical to the plane according to angular command data determined with respect to a base axis of the absolute coordinate system for working a workpiece at a certain working point thereof with a certain angular position of the hand; input means for inputting working point data representative of the working point in terms of a local coordinate system related to the workpiece, angular position data representative of the angular position of the hand at the working point determined with respect to a base axis of the local coordinate system, and position data of the workpiece located along th plane in terms of the absolute coordinate; calculation means for calculating linear and angular displacements of the local coordinate system relative to the absolute coordinate system according to the position data of the workpiece provided by the input means; first transformation means for transforming the local working point data provided by the input means to absolute position command data according to the calculated linear and angular displacements; second transformation means for transforming the local angular position data provided by the input means to absolute angular command data according to the calculated angular displacement; and drive means for driving a hand to the working point and the angular position according to the absolute position and angular command data.

10. A robot controlling system according to claim 9; wherein the hand has means for sequentially working a plurality of workpieces at the same working points thereof with the same angular positions of the hand.

11. A robot controlling system according to claim 10; wherein the input means has means for providing different position data of the workpieces differently positioned along the plane.

12. A robot controlling system according to claim 11; wherein the calculation means has means for calculating different linear and angular displacements of the local coordinate systems corresponding to respective ones of the workpieces according to the different position data; the first transformation means has means for transforming the same local working point data to the different absolute position command data corresponding to respective ones of the workpieces; and the second transformation means has means for transforming the same local angular position data to the different absolute angular command data corresponding to respective ones of the workpieces according to the different angular displacements.

13. A robot controlling system according to claim 9; including a plurality of hands having respective absolute coordinate systems for working the same workpiece.

14. A robot controlling system according to claim 13; wherein the calculation means has means for calculating different linear and angular displacements of the local coordinate system relative to the different absolute coordinate systems corresponding to the different hands; the first transformation means has means for transforming the same local working point data to the different absolute position command data corresponding to respective ones of the hands according to the different linear and angular displacements; and the second transformation means has means for transforming the same local angular position data to the different absolute angular command data corresponding to respective ones of the hands according to the different angular displacements.

15. A robot controlling system according to claim 9; wherein the input means includes jogging means for teaching the working point data to the robot controlling system.

16. A robot controlling system according to claim 23; wherein the jogging means operates to move the hand along the plane but not to rotate the hand around the vertical axis during the teaching operation.

17. A robot controlling system according to claim 9; including means defining the local coordinate system in the form of a local orthogonal coordinate system, and means defining the absolute coordindate system in the form of an absolute orthogonal coordinate system.

18. A robot controlling system according to claim 17; wherein the input means includes means for determining the angular position data with respect to one axis of the local orthogonal coordinate system.

19. A robot controlling system according to claim 17; wherein the input means includes means for determining the position data of the workpiece by a plurality of reference points defined on the workpiece.

20. A robot controlling system according to claim 27; wherein the input means includes means defining the reference points in the form of an origin point of the local orthogonal coordinate system and another point existing on one axis thereof.

21. A robot controlling system according to claim 9; wherein the second transformation means includes means for adding the calculated angular displacement data to the local angular position data to obtain the absolute angular command data.

22. A method for controlling a robot having a hand movable along a plane according to position command data determined based on an absolute coordinate system, and rotatable around an axis vertical to the plane according to angular command data determined with respect to a base axis of the absolute coordinate system for working a workpiece at a certain working point thereof with a certain angular position of the hand; the method comprising the steps of: positioning the workpiece along the plane defined by the absolute coordinate system; providing working point data representative of the working point in terms of a local coordinate system coordinated to the workpiece, angular position data representative of the angular position of the hand at the working point measured with respect to a base axis of the local coordinate system, and position data of the workpiece in terms of the absolute coordinate; calculating the linear and angular displacements of the local coordinate system relative to the absolute coordinate system according to the position data of the workpiece; transforming the local working point data to the absolute position command data according to the calculated linear and angular displacements; and transforming the local angular position data to the absolute angular command data according to the calculated angular displacement.

* * * * *